Aug. 15, 1933.　　　F. A. BULLINGTON　　　1,922,353

SUPERPRESSURE OVERHEAD VALVE ENGINE

Original Filed Feb. 20, 1928

INVENTOR
Frank A. Bullington
BY Alfred R. Fuchs
ATTORNEY

Patented Aug. 15, 1933

1,922,353

UNITED STATES PATENT OFFICE 1,922,353

SUPERPRESSURE OVERHEAD VALVE ENGINE

Frank A. Bullington, Kansas City, Mo., assignor to Bullington Engine Heads, Kansas City, Mo., a common law trust consisting of Louis R. Ash, Howard P. Treadway and Frank A. Bullington Application February 20, 1928, Serial No. 255,659
Renewed December 14, 1932

16 Claims. (Cl. 123—191)

My invention relates to internal combustion engines and cylinder heads therefor, and more particularly to a high compression cylinder head having an overhead passage opening substantially centrally into the cylinder and providing inlet and exhaust means for the cylinder.

It is a purpose of my invention to provide a cylinder head of the above mentioned character having means for restricting the area of of the piston to which initial explosion pressure is applied, which is arranged concentrically to the axis of the piston and cylinder with which the same is associated.

It is a further purpose of the invention to apply the combustion pressure to the piston in two stages and to apply the primary combustion pressure and the secondary combustion pressure substantially concentrically of the piston, or in such a manner that the pressure will be applied in a balanced manner to the piston head.

It is a further purpose of the invention to provide a cylinder head having its combustion space divided into a plurality of chambers, said chambers being arranged so as to open into the cylinder in a substantially concentric manner and one of said chambers having an overhead inlet valve associated therewith. Said last mentioned chamber is preferably also provided with an exhaust valve and has ignition means therein, whereby the same constitutes the primary combustion chamber.

The inlet valve and the ignition means are preferably associated with the opening in the cylinder from the primary combustion chamber so as to be in close proximity thereto, and in the form of the invention shown in the drawing, the inlet valve passage is located in substantial alignment with the passage leading from the combustion chamber into the cylinder.

The secondary combustion chamber is preferably annular and disposed around the opening from the primary combustion chamber into the cylinder, and annular means for restricting the area of the piston to which direct initial explosion pressure is applied is preferably disposed between the combustion chambers.

Means is also preferably provided for positive combustion control in the secondary chamber, said means serving as separating means effective between the two combustion chambers at the time of initial combustion in the primary chamber. Said separating means is adapted to establish a fixed relationship of communication between the chambers independent of the variation in the mechanical clearance between the piston head and the cylinder head portion cooperating with the piston head to restrict direct application of initial explosion pressure to a portion of said piston. Said positive combustion control means preferably comprises a projection or extension on the piston extending into the opening, leading from the primary combustion chamber into the cylinder, at the time that initial combustion takes place in the primary chamber.

The secondary combustion chamber comprises a pressure cushion means for initial explosion pressure in the primary combustion chamber, as the control means mentioned above has sufficient clearance in the opening that the same enters to permit the escape of pressure past the same, but does not have such clearance as would permit propagation of combustion past the same until the projection has moved out of the opening or substantially out of the same. The said chamber constitutes a secondary combustion chamber in that the combustion action therein occurs subsequent to the combustion in the primary chamber, and is in the nature of a secondary explosion of greater pressure magnitude than the primary explosion by reason of the super-compression action on the fuel mixture in the secondary chamber by the initial explosion pressure in the primary combustion chamber. This occurs due to escape of explosion pressure into the secondary chamber and due to the increase in temperature of the fuel mixture in said secondary chamber due to the heating action of the gases escaping into the same from the primary chamber. This is due to fact that the clearance space over the piston between the two chambers is such as to effect and cause the delayed combustion in the secondary chamber producing a double explosion action.

That portion of the primary combustion chamber constituting the exhaust gas passage and the exhaust valve pocket is preferably so arranged that the same is adapted to contain residual burned gas in such a manner as not to be mingled with the fresh fuel charge during its entry into the engine. The secondary combustion chamber is also preferably so arranged as to contain residual burned gas in a manner to keep the same separate from the incoming fuel charge. Thus the fresh fuel charge is drawn into the engine with a minimum of heating due to mingling with the residual hot burned gas and thus my improved cylinder head provides isothermal fuel inlet means for the engine.

Means is also provided for hot spot vaporization of wet fuel just prior to its entry through the inlet valve, said wet fuel heating means being so arranged that a minimum amount of heat is transmitted to the air element in the fresh fuel charge thereby.

The form of engine shown is of the so-called F-head type, being a combination of the so-called valve-in-head and L-head types. The head illustrated is adapted for use on existing engines merely by substitution thereof in place of the standard head for engines of the L-head or F-head type, thus requiring a minimum of changes in the engine in the application thereof.

Other objects and advantages of my invention will appear as the description of the drawing proceeds. I desire to have it understood, however, that I do not intend to limit myself to the details shown or described, but that I intend to include as part of my invention all such obvious changes and modifications as would occur to a person skilled in this art and as would fall within the scope of the claims.

In the drawing:—

Figure 2:
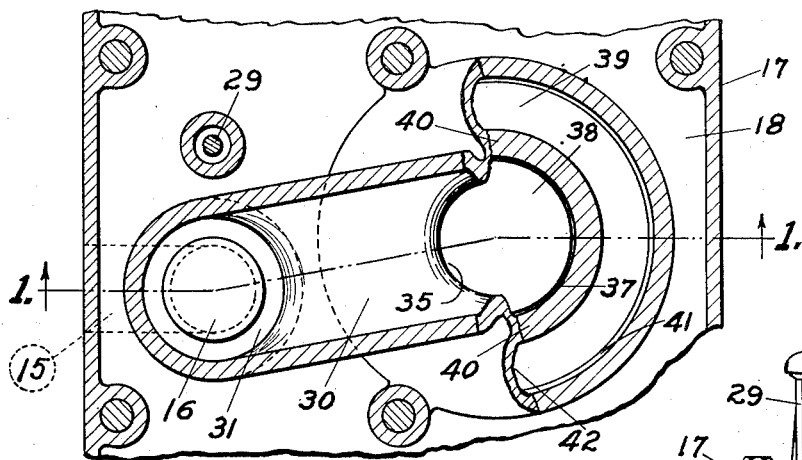
Fig. 2 is a fragmentary section of the cylinder head taken substantially on the line 2—2 of Fig. 1 looking in the direction of the arrows.
Figure 3:
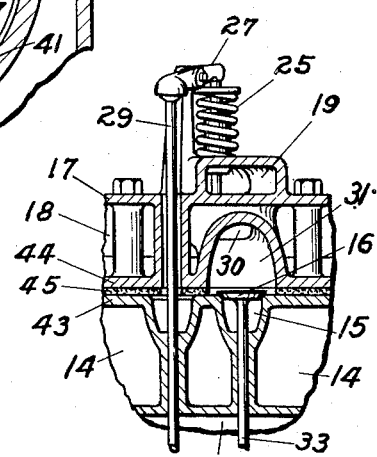
Fig. 3 is a reduced fragmentary section taken on the line 3—3 of Fig. 1.

Referring in detail to the drawing, my improved cylinder head is shown as being applied to an engine having a cylinder 10, in which the piston 11 is adapted to reciprocate, said piston being mounted on the piston rod 12 by means of a pivot member 13. The cylinder is provided with a water space 14 and has an exhaust passage 15 provided with the exhaust valve 16.

Cooperating with said cylinder is the cylinder head 17 having a water space 18 and provided with an inlet passage 19 leading to the valve pocket 20 comprising a primary combustion chamber, and provided with an inlet valve 21, said inlet valve having a valve stem 22 extending through the guide passage in the guide boss 23 on said cylinder head and normally held in engagement with the seat 24 by the spring 25 engaging the flange 26 on the valve stem. Said valve 21 is operated by means of the rocker arm 27 pivotally mounted on the upstanding ear 28 and the push rod 29 engaging therewith.

The cylinder head is also provided with an exhaust passage 30 leading to the exhaust valve pocket 31, into which the valve 16 projects upon opening movement thereof. The valve 16 engages the seat 32 and is provided with the valve stem 33 operated in a well known manner. A wall or partition 34 is provided between the passages 19 and 30 that is not provided with any circulating cooling medium in contact therewith. The exhaust gases passing through the passage 30 thus heat the wall 34, said wall constituting a hot spot for vaporization of any wet fuel particles in the inlet passage 19 engaging therewith. As the wall 34 is located on the bottom of the inlet passage the particles of wet fuel will tend to engage therewith, and said fuel will be heated thereby to vaporize the same without appreciably heating the air content of the fresh fuel mixture passing through the passage 19.

The valve pocket 20 has a portion 35 extending in the direction of the axis of the cylinder 10 which terminates in a flared end portion 36 opening into the cylinder 10 through the short cylindrical passage 37. The piston is provided with a short substantially cylindrical projection 38 extending from the face of the piston head 39 said projection being adapted to pass into the cylindrical portion 37 of the passage leading from the valve pocket 20, and having sufficient clearance from the wall of the portion 37 to permit escape of gases under pressure past the projection 38 from the valve pocket 20 but retarding propagation of flame through the clearance space.

An annular projection 40 is provided on the cylinder head surrounding the opening 37 and an annular pocket or groove 41 is provided surrounding the projection 40. The opening 37, projection 40 and groove 41 are all preferably concentrically arranged relative to each other and to the axis of the cylinder 10. The groove 41 is preferably provided with a rounded bottom 42 and of slightly larger radius than the cylinder base. The end wall 43 of the cylinder block is engaged by the wall 44 on the cylinder head to clamp the gasket 45 therebetween. Ignition means 46 is provided in the valve pocket 20 near the inlet valve 21 and between the same and the opening 37 into the cylinder.

By the arrangement described it will be seen that the incoming fresh fuel will enter through the passage 19 and any wet fuel particles in the same will engage with the heated wall 34 to vaporize the same. The fuel charge will then pass into the valve pocket 20 upon opening of the valve 21 and from said valve pocket through the passages 35 and 37 into the cylinder chamber. The hot residual burned gases in the valve pocket 31 and passage 30 will not mingle with the fresh fuel charge. Any residual hot burned gas in the thus preventing undesirable heating of the fresh fuel charge. Any residual hot burned gas in the pocket 41 will also be kept separate from the fresh fuel charge.

Figure 1:
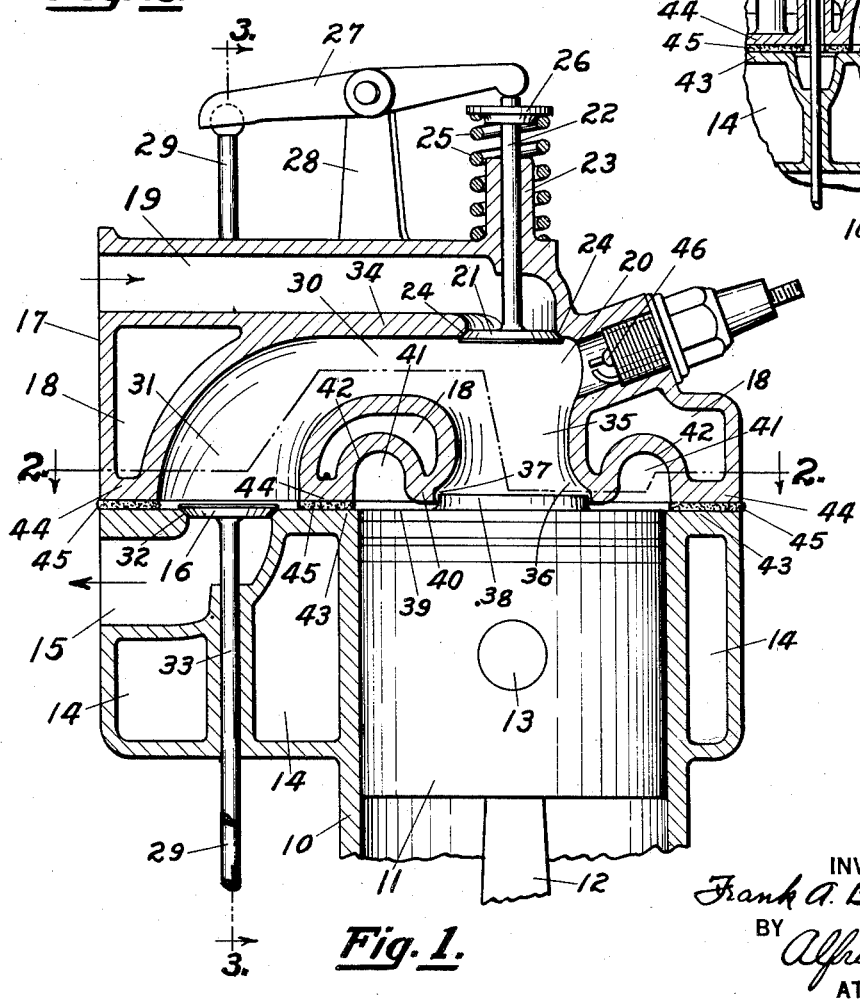
Fig. 1 is a fragmentary vertical section of the head end portion of an engine showing my improved cylinder head applied thereto, the section being taken on a line corresponding to the line 1—1 of Fig. 2.

During the compression stroke the fresh fuel mixture will be compressed into the primary combustion chamber comprising the valve pocket 20 and the passages 35 and 37 and the residual burned gas in the passage 30 and valve pocket 31 will also be compressed in the valve pocket 31 adjacent the valve 16, the passage 30 thus also receiving the fresh fuel mixture during the compression stroke and forming a portion of said combustion chamber. This action will continue until the projection 38 has entered the opening 37 and reached the position shown in Fig. 1. The fresh fuel will also be compressed into the annular pocket 41.

When the projection 38 is in this position ignition takes place at the ignition means 46 and explosive combustion occurs in the primary combustion chamber. Some of the gases under high pressure escape during initial combustion through the space between the side wall of the projection 38 and the wall of the opening 37 and then through the mechanical clearance space between the annular projection 40 and the cylinder head 39 into the groove 41, the groove thus serving as a pressure cushioning chamber for the primary combustion chamber.

The gases under high pressure that enter the secondary combustion chamber provided in said pocket 41 cause a super-compression of the fuel mixture therein, and the contents of said secondary combustion chamber are under such compression, higher than that in the primary combustion chamber prior to ignition, when ignition occurs therein.

Ignition occurs in the secondary combustion chamber only after the projection 38 has passed out of the passage 37, as the clearance space between the walls of the passage and projection is not sufficient for free propagation of combustion therethrough. Said projection 38 thus constitutes a means for positive combustion control in the secondary combustion chamber, and causes a secondary explosion to occur in the secondary combustion chamber with higher initial compression pressure than that in the primary combustion chamber and subsequent thereto.

The projection 40 serves as means to restrict the direct application of initial combustion pressure from the primary chamber to a portion only of the piston, said pressure being applied directly only to the area of the piston exposed by the opening 37, which is arranged centrally of the piston head. The initial explosion pressure from the secondary combustion chamber is also applied concentrically of the piston head, the application of said combustion pressures thus being balanced and any undue wear or loss of power due to unbalanced pressure conditions on the piston head being avoided.

It will be noted that the valve seat 24 is in close proximity to the opening 37 into the cylinder and in alignment therewith and with the axis of the cylinder and that the ignition means is in close proximity to the valve seat 24 and opening 37 and in substantial alignment therewith thus assuring the presence of a highly combustible mixture in proximity to the ignition means under all conditions.

Having thus described my invention what I desire to claim and secure by United States Letters Patent is:—

1. In an engine of the character described, a cylinder, and a cylinder head having a primary combustion chamber comprising an inlet valve pocket and opening into said cylinder an inlet valve in said pocket, ignition means between said inlet valve and said opening into said cylinder, and a secondary combustion chamber surrounding said opening, said secondary combustion chamber being open to the cylinder, but being otherwise permanently closed.

2. In an engine of the character described, a cylinder and a cylinder head having a primary combustion chamber comprising an inlet valve pocket and opening into said cylinder substantially axially thereof an inlet valve in said pocket, ignition means between said inlet valve and said opening into said cylinder, and a secondary combustion chamber surrounding said opening, said secondary combustion chamber being open to the cylinder, but being otherwise permanently closed.

3. In an engine of the character described, a cylinder, and a cylinder head having a primary combustion chamber comprising an inlet valve pocket and opening into said cylinder substantially axially thereof, said cylinder head having an annular groove therein open to the cylinder surrounding said opening.

4. In an engine of the character described, a cylinder, a piston operating in said cylinder, and a cylinder head having a valve pocket and a passage therein leading from said valve pocket into said cylinder, an inlet valve opening into said valve pocket, said engine having an exhaust passage, an exhaust valve associated with said valve pocket and controlling communication between said pocket and said exhaust passage independently of the cylinder, said inlet valve being adjacent said passage leading into the cylinder and said exhaust valve being remote from said passage leading into the cylinder, and piston area restricting portions on said head.

5. In an engine of the character described, a cylinder, a piston operating in said cylinder, and a cylinder head having a valve pocket, said valve pocket having an opening leading into said cylinder substantially axially centrally thereof, said opening being of less area than the cylinder area, means for exhausting the products of combustion from said pocket comprising a passage in said head opening directly into said pocket and an overhead valve opening into said valve pocket and overlying the cylinder chamber.

6. In an engine of the character described, a cylinder, a piston operating therein and a cylinder head having a valve pocket, said cylinder head having an opening leading into said cylinder from said valve pocket, inlet and exhaust valve means communicating with said pocket in spaced relation to the cylinder comprising an overhead valve opening into said valve pocket in close proximity to said opening and means on said cylinder head restricting the direct application of explosion pressure to a portion of the head of said piston to produce a balanced application of said pressure to said piston head.

7. In an engine of the character described, a cylinder, a piston operating therein and a cylinder head having a valve pocket, said cylinder head having an opening leading into said cylinder substantially axially thereof, from said valve pocket, inlet and exhaust valve means for said pocket comprising an overhead valve opening into said valve pocket in close proximity to said opening, said cylinder head having a pair of passage opening into said pocket, said overhead valve controlling communication between one of said passages and said pocket and means on said cylinder head restricting the direct application of explosion pressure to a portion of the head of said piston.

8. In an engine of the character described, a cylinder, a piston operating therein and a cylinder head having a valve pocket, said cylinder head having an opening leading into said cylinder from said valve pocket, inlet and exhaust valve means for said pocket comprising an overhead valve opening into said valve pocket substantially in alignment with the opening into the cylinder, said cylinder head having a pair of passages opening into said pocket, said overhead valve controlling communication between one of said passages and said pocket and the other of said passages opening into said pocket in spaced relation to the cylinder adjacent the opening from the cylinder into said valve pocket and means on said cylinder head restricting the direct application of explosion pressure to a portion of the head of said piston.

9. In an engine of the character described, a cylinder, a piston operating therein, and a cylinder head having a valve pocket, said cylinder head having an opening leading into said cylinder from said valve pocket substantially axially thereof, an inlet valve opening into said valve pocket near said opening into said cylinder, said cylinder head having an exhaust passage therein leading directly into said pocket, and exhaust valve remote from the opening into said cylinder and means for restricting application of explosion pressure from said valve pocket to a portion of the head of said piston.

10. In an engine of the character described, a cylinder, a piston operating therein, and a cylinder head having a valve pocket, said cylinder head having an opening leading into said cylinder from said valve pocket substantially axially thereof, an inlet valve opening into said valve pocket in substantial alignment with said opening into said cylinder, said cylinder head having an exhaust passage therein leading directly into said pocket, and exhaust valve remote from the opening into said cylinder controlling discharge of exhaust gases from said pocket through said passage and means for restricting application of explosion pressure from said valve pocket to a portion of the head of said piston.

11. In an engine of the character described, a cylinder, a piston operating therein, and a cylinder head having a primary combustion chamber opening substantially centrally into the cylinder, a secondary chamber surrounding said primary combustion chamber and means between said chambers for restricting the direct application of initial explosion pressure to a portion of the head of said piston, said secondary chamber being open to the cylinder, but otherwise permanently closed.

12. In an engine of the character described, a cylinder, a cylinder head having a valve pocket therein aligning with the cylinder chamber and said head having distinct inlet and exhaust passages therein leading into said pocket in spaced relation to the cylinder, said cylinder head having an opening leading into said cylinder from said valve pocket, and an overhead valve near the opening into the cylinder, said valve opening into said valve pocket.

13. In an engine of the character described, a cylinder, a cylinder head having a valve pocket and having distinct inlet and exhaust passages therein leading into said pocket in spaced relation to the cylinder, a solid wall portion between said passages heated by the hot gases in the exhaust passage, said cylinder head having an opening leading into said cylinder from said valve pocket, and an overhead valve near the opening into the cylinder, said valve opening into said valve pocket.

14. In an engine of the character described, a cylinder, a cylinder head having an inlet valve pocket, an inlet passage leading to said pocket, a passage leading from said inlet valve pocket substantially centrally into said cylinder, an exhaust valve pocket spaced from said inlet valve pocket and an exhaust passage distinct from said inlet passage leading directly from said inlet valve pocket to said exhaust valve pocket independently of the cylinder.

15. A cylinder head of the character described having a valve pocket therein, an overhead valve opening into said pocket, said cylinder head having an opening leading from said valve pocket and having a groove surrounding said opening.

16. In an engine of the character described, a cylinder, a piston operating therein, a cylinder head having a combustion chamber therein, inlet and exhaust valves opening into said chamber independently of the cylinder, ignition means in said chamber, said cylinder head having a passage leading from said chamber substantially centrally into said cylinder and means on said piston cooperating with said passage for controlling the application of combustion pressure to said piston.

FRANK A. BULLINGTON.

CERTIFICATE OF CORRECTION.

Patent No. 1,922,353. August 15, 1933.

FRANK A. BULLINGTON.

It is hereby certified that error appears in the printed specification of the above numbered patent requiring correction as follows: Page 3, line 113, claim 7, for "passage" read passages; and line 145, claim 9, for "and" read an; page 4, line 9, claim 10, for "and" read an; and that the said Letters Patent should be read with these corrections therein that the same may conform to the record of the case in the Patent Office.

Signed and sealed this 21st day of November, A. D. 1933.

(Seal)

F. M. Hopkins
Acting Commissioner of Patents.